US009087385B2

(12) United States Patent
Fredlund et al.

(10) Patent No.: US 9,087,385 B2
(45) Date of Patent: Jul. 21, 2015

(54) METHOD FOR IMPROVING IMAGES CAPTURED UNDERWATER

(71) Applicant: FMV Innovations, LLC, Alpharetta, GA (US)

(72) Inventors: John R. Fredlund, Rochester, NY (US); Steven M. Rogers, Webster, NY (US)

(73) Assignee: FMV Innovations, LLC., Alpharetta, GA (US)

( * ) Notice: Subject to any disclaimer, the term of this patent is extended or adjusted under 35 U.S.C. 154(b) by 60 days.

(21) Appl. No.: 14/071,725

(22) Filed: Nov. 5, 2013

(65) Prior Publication Data

US 2014/0133750 A1 May 15, 2014

Related U.S. Application Data

(60) Provisional application No. 61/725,048, filed on Nov. 12, 2012.

(51) Int. Cl.

*G06K 9/00* (2006.01)
*G06T 5/00* (2006.01)
*G06T 5/40* (2006.01)
*G06T 5/50* (2006.01)

(52) U.S. Cl.

CPC . *G06T 5/009* (2013.01); *G06T 5/40* (2013.01); *G06T 5/50* (2013.01); *G06T 2207/10024* (2013.01); *G06T 2207/20221* (2013.01)

(58) Field of Classification Search

CPC . G06K 9/40; H04N 1/32773; H04N 5/51225; H04N 5/2252; H04N 5/2256; H04N 5/23238; H04N 7/18; H04N 9/09; H04N 21/4223; H04N 21/4227; G06T 5/005; G06T 5/007; G06T 5/008; G06T 5/50; G06T 7/2053; G06T 2207/1004; G06T 2207/10024; G06T 2207/10032; G06T 2207/20216; G06T 2207/20224; G03B 17/08; G03B 27/32; B63C 11/48; B63G 8/38

See application file for complete search history.

(56) References Cited

U.S. PATENT DOCUMENTS

| | | | | |
|---|---|---|---|---|
| 4,485,398 | A * | 11/1984 | Chapin et al. | 348/81 |
| 5,719,715 | A * | 2/1998 | Westhaver | 359/885 |
| 5,909,244 | A * | 6/1999 | Waxman et al. | 348/222.1 |
| 6,263,792 | B1 | 7/2001 | Fredlund | |
| 7,630,077 | B2 * | 12/2009 | Schultz et al. | 356/366 |
| 8,115,822 | B2 * | 2/2012 | Mimura et al. | 348/222.1 |
| 8,193,967 | B2 * | 6/2012 | Nguyen et al. | 342/25 F |
| 8,750,603 | B2 * | 6/2014 | Bethge et al. | 382/159 |
| 2004/0114054 | A1 * | 6/2004 | Mansfield et al. | 348/700 |

FOREIGN PATENT DOCUMENTS

| | | | | |
|---|---|---|---|---|
| WO | WO 95/12285 | * | 5/1995 | H04N 7/18 |
| WO | WO 98/38851 | * | 9/1998 | A01K 91/08 |
| WO | WO 2013/116100 A1 | * | 8/2013 | G01C 11/02 |

* cited by examiner

*Primary Examiner* — Jose Couso

(74) *Attorney, Agent, or Firm* — Louis S. Horvath

(57) ABSTRACT

A method for image processing, the method executed at least in part by a computer system, acquires a digital image as a collection of image pixels and calculates from a plurality of the image pixels, at least one statistical measurement. The at least one calculated statistical measurement is associated with a predetermined modification function setting according to a best-fit function that has been calculated from a database of sample images. A processed image is formed by adjusting the acquired collection of image pixels according to the associated predetermined modification function setting and the processed image is displayed.

18 Claims, 8 Drawing Sheets

METHOD FOR IMPROVING IMAGES CAPTURED UNDERWATER

CROSS REFERENCE TO RELATED APPLICATIONS

This patent application claims the benefit of priority to U.S. Provisional Patent Application Ser. No. 61/725,048, entitled "METHOD FOR IMPROVING IMAGES CAPTURED UNDERWATER," filed on Nov. 12, 2012, which is hereby incorporated by reference herein in its entirety.

FIELD OF THE INVENTION

The present invention relates to improvement of image files captured underwater using digital image manipulation.

BACKGROUND OF THE INVENTION

Displayed or printed color images obtained from scenes captured underwater are typically very disappointing to the amateur photographer. When an image is captured underwater, the red portion of the illuminating light is largely filtered out by the water. This filtering effect is more pronounced at greater depths and at increased distance from the subject to the camera and results in images lacking the appropriate amount of red illumination. Images captured underwater thus appear shifted to the blue or green portions of the spectrum. Additionally, contrast and sharpness of such images are often disappointing.

The captured image may consist of an accurate rendition of the scene content; however, it is typically not what the photographer or diver remembers of the scene. Most photographers automatically interpret the scene to be much more vibrant, likely due to a complex interaction of the human visual system and the brain. What photographers remember is a much higher contrast image with brighter colors.

In the underwater environment, available light for photography is reduced and photography becomes more challenging with greater depth, as the red illumination is filtered and the overall illumination decreases. This problem persists even when underwater illumination systems are provided, because the red illumination is filtered by the amount of water between the underwater illumination source and the subject; this filtering effect increases due to the amount of water in the return path from the subject to the camera. As a result, underwater images often suffer from poor image quality when reproduced by traditional systems.

Fredlund, in U.S. Pat. No. 6,263,792, describes a method for printing images captured underwater. Image analysis is performed to determine if images were captured underwater. Images captured underwater are then subjected to a predetermined correction. Amplification of the red illumination channel is described. Additionally, averaging out high frequency noise in the amplified red channel and contrast expansion in all the channels is taught.

Placing a filter, such as one which passes red wavelengths and attenuates blue and green, over the camera's lens and metering system can help to improve image quality; however, this filtering decreases the overall light level and maintains a fixed ratio between the color channels. A fixed ratio can yield an undesirable amount of correction because the relative illumination in the red channel decreases with respect to blue and green with increasing depth and distance to the subject.

In U.S. Pat. No. 5,719,715, Westhaven describes a family of filters for use in capturing images that attenuates blue and green light while passing red. However, use of such filters requires changing to the appropriate filter for each depth or distance to subject. This procedure can be tedious and error prone, poorly suited for the amateur underwater photographer.

While flash systems and other artificial lighting can be utilized, the distance between the subject and camera must also be considered. While macro exposures are often used to minimize this distance problem, close-up photography may not be practical or desirable with many subjects. Additionally, use of flash systems often introduces other problems.

Video capture provides another set of problems. Generally, illumination systems are not employed for video use, and the exposure time is limited by the video frame rate. The red channel is affected in the same manner as with still image capture, and overall sharpness and contrast are also reduced.

Post capture image modification can also be used to correct these problems for both still and video capture, but the techniques used require expertise in image manipulation, utilizing expensive and complex software tools and are often very tedious to use. Additionally, the same image improvements applied to one underwater image will not necessarily improve the appearance of another image captured underwater. There is a great deal of variance in images captured underwater with the same equipment, due to variations in depth, distance to subject, water quality, available sunlight, flash illumination, and local water color. Hence, this type of modification must be tailored specifically to each image, increasing the time requirement and the need for expertise when improving a number of images.

There exists a need to improve the quality of images captured underwater without employing cumbersome and expensive equipment and without requiring use of software tools requiring expertise in image manipulation techniques.

SUMMARY OF THE INVENTION

It is an object of the present invention to advance the art of image processing, particularly for images captured in underwater conditions. Advantageously, the method of the present invention addresses problems known to images obtained underwater and provides solutions for improving image quality for such images in an automated process.

According to an embodiment of the present invention, there is provided a method for image processing, the method executed at least in part by a computer system and comprising:

a) acquiring a digital image as a collection of image pixels;

b) calculating, from a plurality of the image pixels, at least one statistical measurement;

c) associating the at least one calculated statistical measurement with a predetermined modification function setting according to a best-fit function that has been calculated from a database of sample images;

d) forming a processed image by adjusting the acquired collection of image pixels according to the associated predetermined modification function setting;

and e) displaying the processed image.

According to an alternate embodiment of the present invention, there is provided a method for image processing, the method executed at least in part by a computer system and comprising:

a) acquiring a digital image as a collection of image pixels;

b) determining that the image was captured underwater;

c) calculating, from a plurality of the image pixels, a statistical measurement;

d) associating the calculated statistical measurement with a predetermined modification function setting according to a best-fit function that has been calculated from a database of sample images;

e) forming a processed image by adjusting the acquired collection of image pixels according to the associated predetermined modification function setting;

and f) displaying the processed image.

According to another alternate embodiment of the present invention, there is provided a method for image processing, the method executed at least in part by a computer system and comprising:

a) acquiring a digital image as a collection of image pixels, wherein the digital image has at least a first, a second, and a third color channel;

b) determining that the image was captured underwater;

c) calculating, from a plurality of the image pixels in at least the first color channel, a statistical measurement;

d) associating the calculated statistical measurement with a predetermined modification function setting according to a best-fit function that has been calculated from a database of sample images;

e) forming a processed image by adjusting the acquired collection of image pixels according to the associated predetermined modification function setting, wherein the adjustment changes pixel values in each of the first, second, and third color channels;

and f) displaying the processed image.

The above and other objects, advantages and novel features of the present invention will become more apparent from the accompanying detailed description thereof when considered in conjunction with the following drawings.

BRIEF DESCRIPTION OF THE DRAWINGS

Embodiments of the invention will now be described with reference to the drawings in which.

DETAILED DESCRIPTION OF THE INVENTION

The present description will be directed, in particular, to image manipulation techniques used in accordance with the present invention, it being understood that elements not specifically shown or described may take various forms well known to those skilled in the art.

Where they are used in the context of the present disclosure, the terms “first”, “second”, and so on, do not necessarily denote any ordinal, sequential, or priority relation, but are simply used to more clearly distinguish one step, element, or set of elements from another, unless specified otherwise.

As noted in the background section, the attenuation of red illumination by water is well known. Images captured underwater without the benefit of flash illumination typically appear shifted toward the blue or green portions of the spectrum, and often have low contrast and limited sharpness. Additionally, images captured with flash illumination can also suffer from these problems when the subject is not close to the image taking lens.

Figure 1A:
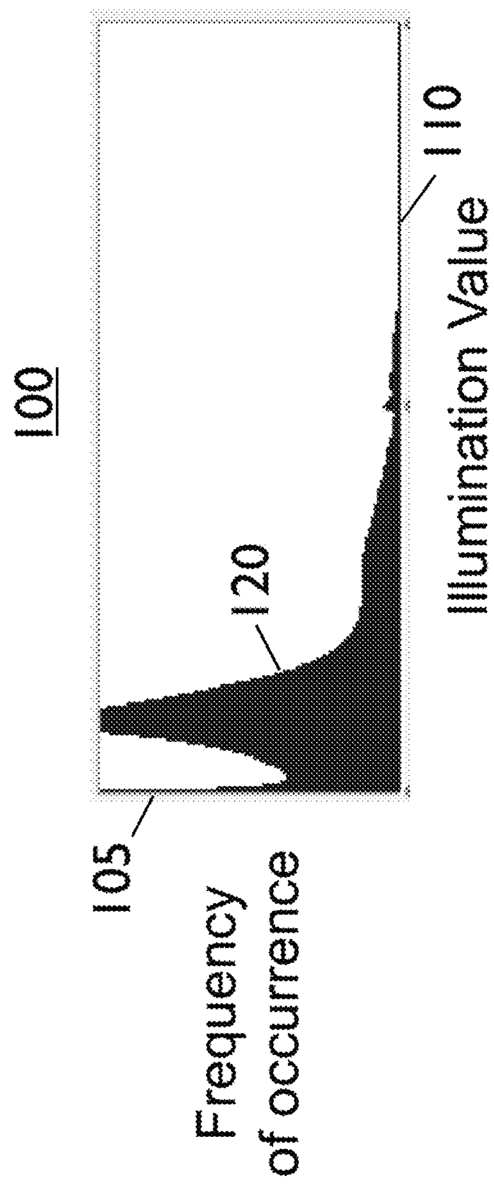
FIGS. 1A, 1B, and 1C are histograms showing a typical distribution of pixels in red, green, and blue color channels for an image captured underwater.
Figure 1B:
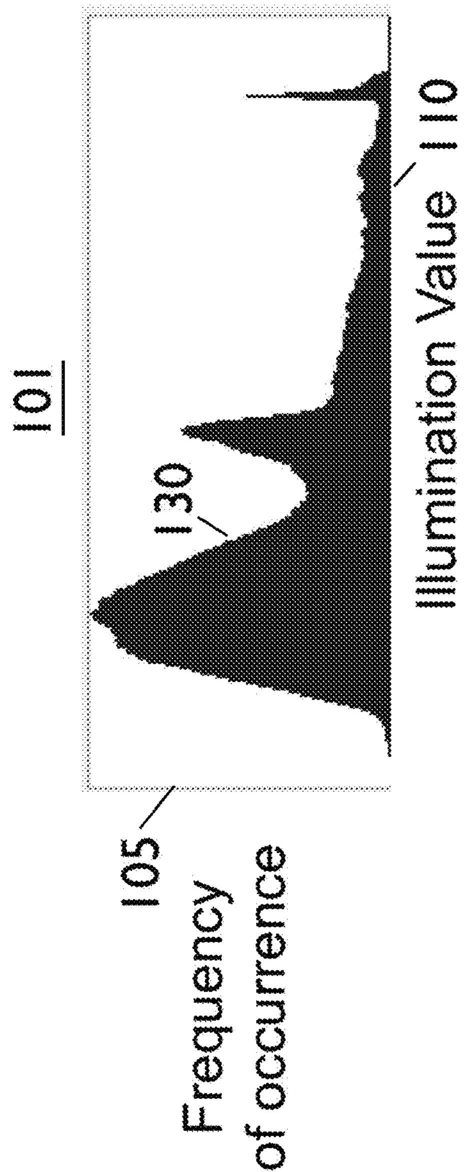
Figure 1C:
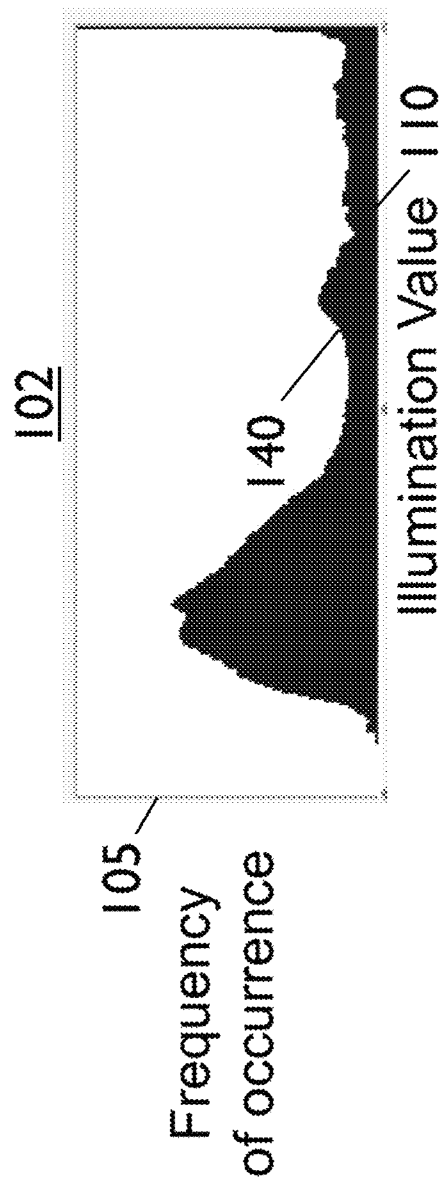

FIGS. 1A, 1B, and 1C show typical histogram distribution of pixels in the three color channels for an image captured underwater. In the histogram format, a vertical axis 105 represents the frequency of occurrence for pixels in the image, ranging from a zero value on the bottom (on a horizontal axis 110) to the highest value at the top. Along horizontal axis 110 are the illumination value for pixels, with little or no illumination at the left end of the axis, indicating pixels that have little or no illumination in the channel; the frequency of pixels having higher levels of illumination are shown at the right. For a channel with eight bit pixels, the rightmost value is 255 in the representation of FIGS. 1A, 1B, and 1C. Most illumination values fall somewhere between zero and 255. Curves 120, 130 and 140 indicate the frequency of occurrence at each illumination value in the red, green and blue channels, respectively.

FIG. 1A shows a red channel histogram 100 for pixel values in the red channel. Note that the frequency of occurrence of a large majority of the pixels lies toward the left side of the graph, indicating that there is little in the scene that is brightly illuminated with red illumination. This histogram characteristic is typical of images captured underwater.

FIG. 1B shows a green channel histogram 101 for pixel values in the green channel. Note that the frequency of occurrence is better distributed across the full range than with the red channel histogram 100 of FIG. 1A, but is still lacking in the lowest and highest portions on the graph. This is also typical for images captured underwater, and is indicative of the low contrast in most images captured underwater.

FIG. 1C shows a blue channel histogram 102 for pixel values in the blue channel. The histogram of this channel is similar to that of the green channel of FIG. 1B, and manifests itself visually in the same manner. Looking at the three histograms of FIGS. 1A, 1B, and 1C in combination, it can be seen that the underwater image is generally shifted to the blue/green and exhibits low contrast.

A method for improving images captured underwater is described. A digital image captured underwater is selected. The pixels of the image are analyzed to provide a statistical representation of the image. These statistics include but are not limited to the mean, median, measures of standard deviation, percentile rankings, frequency of occurrence, mode, and other statistical measures that can be derived from the collection of image data that forms an image. These measures may be for the entire image or for a subset determined either spatially, or by color channel, or using combined spatial and color channel data. Depending upon the statistics calculated for the image and using a predetermined curve obtained from viewing a large, representative sample set of underwater images, the selected image is adjusted to better approximate more desirable values that represent more faithfully the color, contrast, and other characteristics of a scene as it would be perceived by an underwater viewer.

Statistical analysis of the selected image is useful because there can be significant variation within a set of underwater images due to factors such as relative depth, distance to subject, water quality, available sunlight, use of flash illumination, and local water color, for example. The applicants have found that, in much the same way that no single optical filter is suitable for all imaging conditions, no single color shift or other modification of the image data, if arbitrarily applied to numerous images captured underwater, yields the desired effect of improving all images. Thus, according to an embodiment of the present invention, image-specific improvements are determined for each image. Advantageously, an automated approach based on image characteristics can help to improve images without requiring individual user attention for each image.

Figure 2:
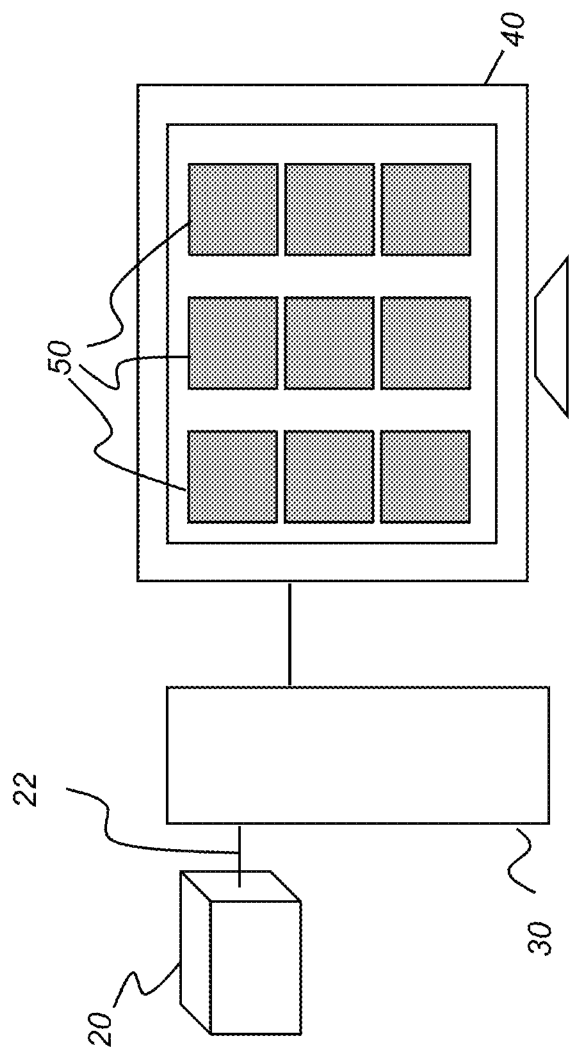
FIG. 2 is a schematic diagram showing a system for processing and displaying images obtained underwater.

The schematic block diagram of FIG. 2 shows image acquisition, processing, and display hardware used for automatically processing underwater images according to an embodiment of the present invention. The method executes on a computer system, such as a computer workstation, personal computer, laptop, or handheld processor, for example, represented in FIG. 2 as a computer 30. Underwater images can be obtained from a camera 20 in a number of ways, such as by connecting camera 20 to computer 30 using a cable 22 or a wireless connection, for example. The images can be obtained directly from camera memory or from an image captured by an underwater camera and stored on a hard disk or on a memory that is accessible to the computer system. One or more images 50 are shown on a display 40 that is in signal communication with computer 30. Images 50 can be different images from different scene content or may be different versions of the same scene content, processed to have different appearance, as described in more detail subsequently.

Figure 3:
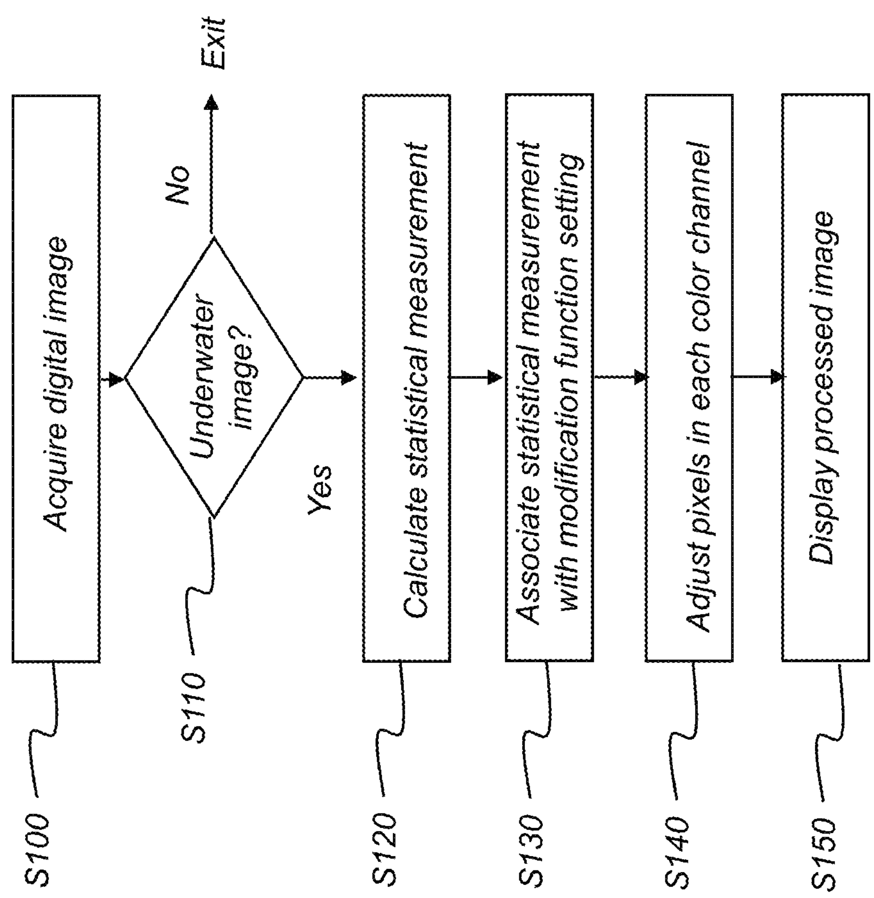
FIG. 3 is a logic flow diagram that shows a sequence of steps for image processing according to an embodiment of the present invention.

The logic flow diagram of FIG. 3 shows a sequence of steps used for processing an image captured in underwater conditions according to an embodiment of the present invention. An image acquisition step S100 acquires a color digital image as a collection of image pixels. An optional image type identification step S110 can be executed in order to determine whether or not the image is an underwater image. This step can use the image analysis described in detail in U.S. Pat. No. 6,263,792 to Fredlund, for example, or may use other types of image analysis that ascertain whether or not the image has characteristics of an underwater image. This optional analysis may determine, for example, that an image can be improved using the process that follows, whether or not the image was originally acquired underwater; alternately, processing may offer the option to exit where the image does not appear suitable for processing.

Continuing with the sequence of FIG. 3, a calculation step S120 then calculates a statistical measurement based on values for any number of image pixels from the acquired digital image. As described in more detail subsequently, calculation may be directed to any or all of the color channels in the image. According to an embodiment of the present invention, where the image has three color channels, red, green, and blue, the green color channel is used for this calculation. The statistic that is calculated is used to characterize the image and provides a type of index, in an association step S130, that is used to determine how much adjustment of the image is performed. This step associates the calculated statistical measurement to a predetermined modification function setting, as described in more detail subsequently. Based on this association, a processing step S140 is executed, processing the image by adjusting the acquired collection of image pixels according to the predetermined modification function setting. The adjustment can change pixel values in any or all of the color channels. According to an embodiment of the present invention, the adjustment changes pixel values in each of the first, second, and third color channels, such as in the red, green, and blue color channels. A processed image is formed in step S140, then displayed in a display step S150.

The calculation and use of a statistical measurement provides a relatively straightforward and efficient tool for characterizing image appearance. The goal of image processing is to provide correction in a manner that is relatively uncomplicated for the end-user and allows at least a better approximation of scene appearance as captured underwater.

Figure 4A:
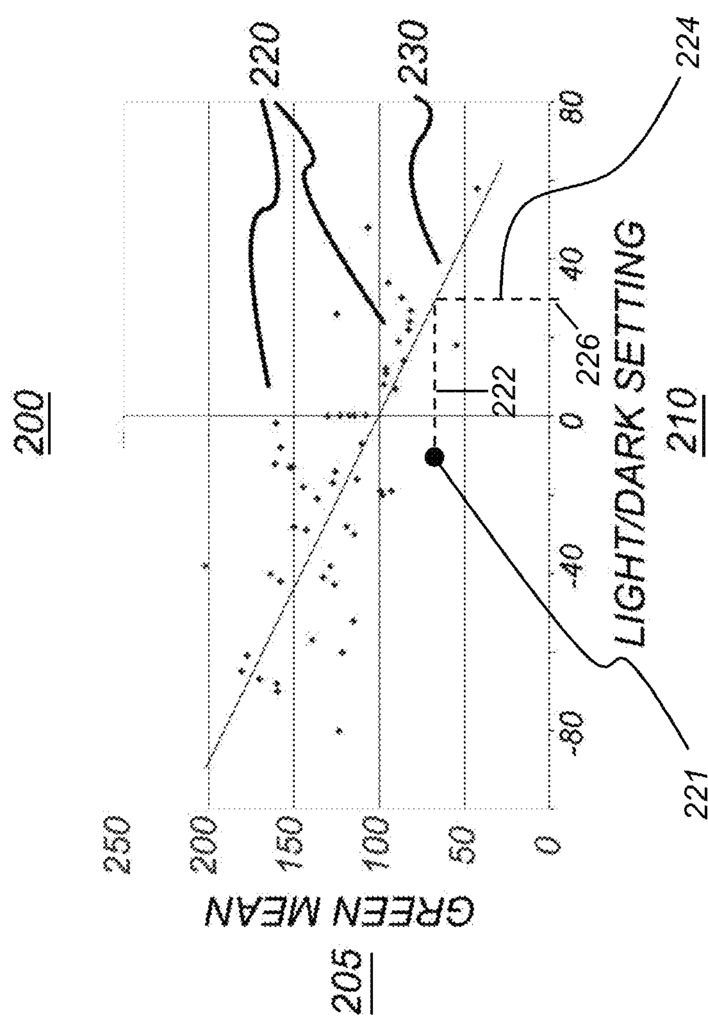
FIGS. 4A, 4B, and 4C are graphs that show how the association step of FIG. 3 operates to improve a collection of multiple images captured underwater using a particular set of statistics.
Figure 4B:
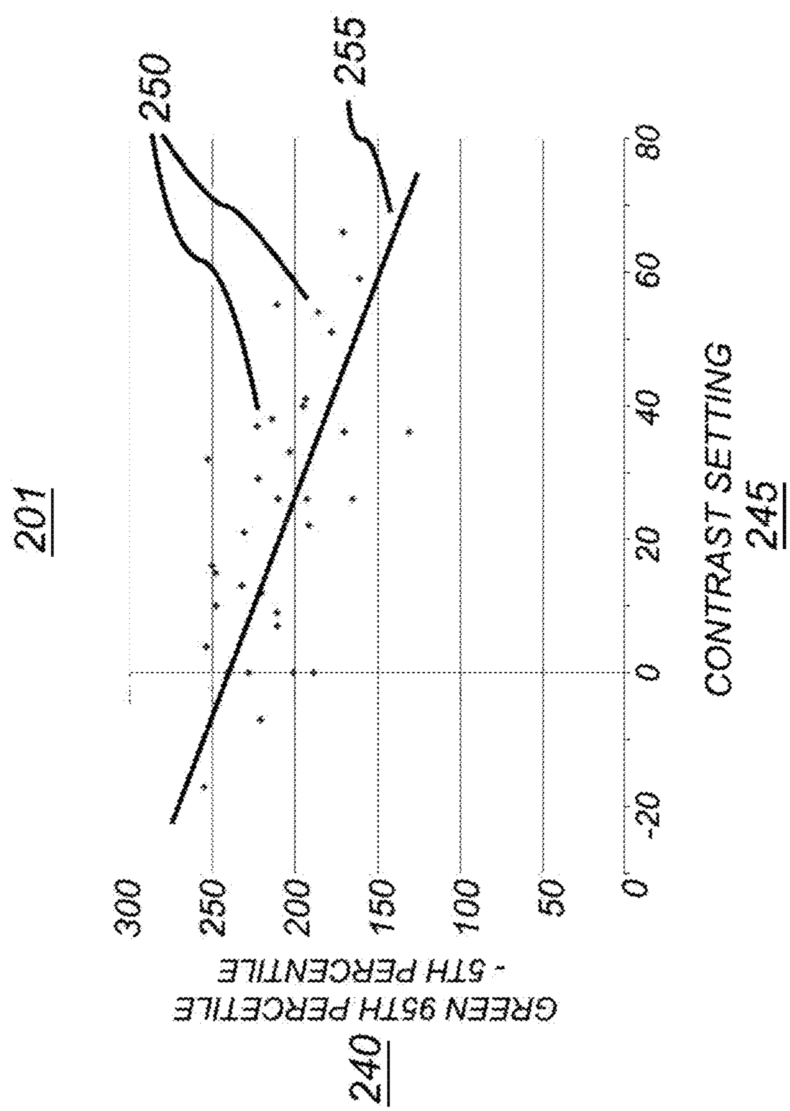
Figure 4C:
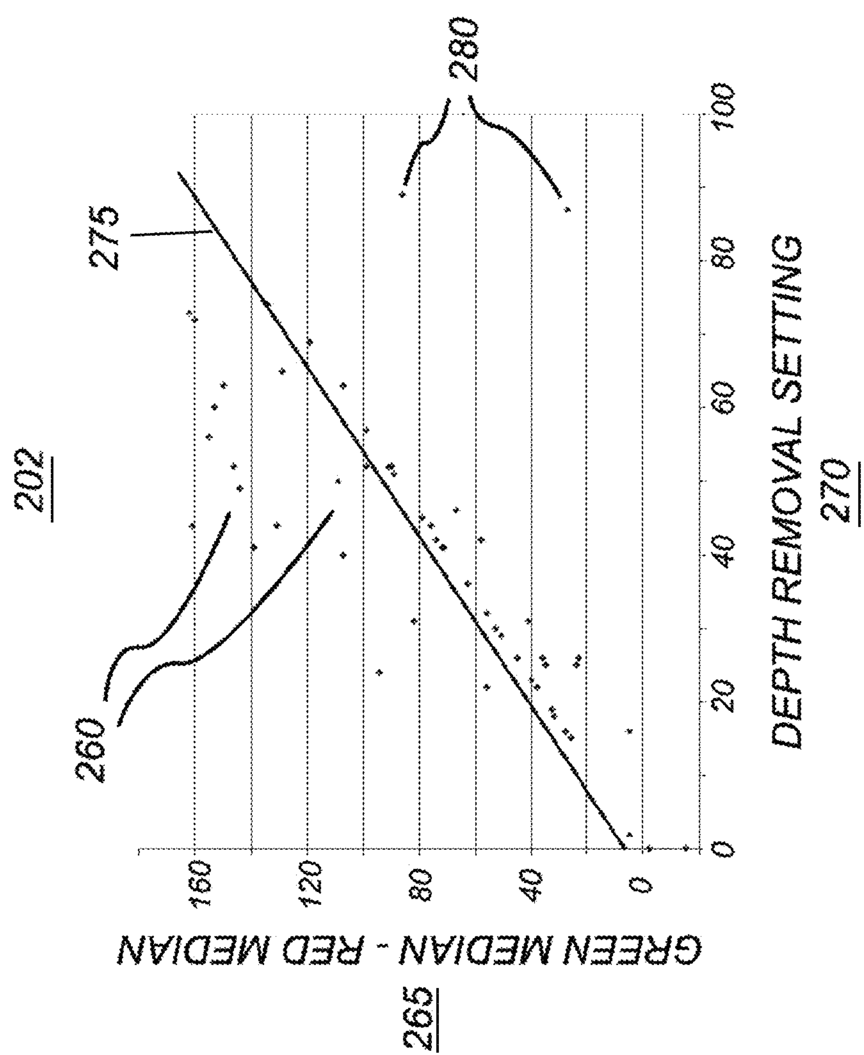

The graphs of FIGS. 4A, 4B, and 4C show how association step S130 of FIG. 3 operates to improve a collection of multiple images captured underwater using a particular set of statistics. The statistics described are used by way of example and not by way of limitation, intended to show how the image processing is executed.

FIG. 4A shows a scatter plot 200 of the calculated statistical mean value of the unmodified green channel for a collection of sample images. Each dot on the scatter plot in this example indicates the calculated statistical mean value that is representative of brightness or luminance of an image, approximated from values in the green channel. Luminance or lightness may also be referred to as light/dark, or brightness, and is used to determine an offset that is added or subtracted from the pixels in the image to create the effect of more or less lightness in the image.

A predetermined modification function 230, shown as a best-fit line superimposed on the scatter plot in this example, provides a mechanism for associating the calculated statistical measurement for each image in a collection of images to a corresponding predetermined modification function setting. This association is then used by the processing sequence to determine how to adjust the lightness for an image from the user. Each plotted value 220 represents a single image from a database of sample images that have been previously assessed. The placement of any particular plotted value 220 on the graph corresponds to the measured mean value of the unmodified green channel on the vertical axis 205. Any new image is then processed using the previously calculated results that were used to generate modification function 230. FIG. 4A shows one example of the association between the statistical measurement of a plotted value 221 (shown enlarged for clarity) for a newly provided user-supplied image and a predetermined modification function setting 226. A horizontal line 222 is extended from the plotted value 221 to predetermined modification function 230. Then, a vertical line 224 from the predetermined modification function 230 indicates a setting 226 on horizontal axis 210. The value shown on the horizontal axis 210 is the modification function setting 226, a modification factor that is used to determine how much adjustment of the image is to be performed in processing step S140 (FIG. 3). In the particular example of FIG. 4A, the associated modification function setting 226 gives a brightness setting of about +30. In this way, horizontal axis 210 thus indicates a modified lightness setting for each image, with decreased lightness where the setting value lies toward the left of the 0 vertical axis, and higher lightness toward the right.

Continuing with the example shown in FIG. 4A, the modification function setting that is obtained can be used as a factor for adjusting image appearance of a user image in a number of ways. According to an embodiment of the present invention, the pixel values in one or more image channels are all shifted proportionally according to the indicated light/dark setting. Thus, for example, where the modification function setting 226 is +30, each pixel value in the one or more color channels of interest are incremented by a value of +30. According to an alternate embodiment of the present invention, more complex computation is used to adjust pixel values in one or more color channels in order to obtain improved brightness, contrast, or other imaging characteristic according to the modification function setting that is obtained. For example, an average or maximum adjustment of +30 may be used for pixels in one or more color channels of the image. With respect to the histogram representation shown in FIGS.

1A-1C, this adjustment indicates how the histogram data is effectively changed for display rendering.

Predetermined modification function 230 in FIG. 4A thus provides an approximation of the trend in viewer-preferential lightness settings for the range of mean values in the green channel. In practice, modification function 230 is used to determine a modification factor that is used to automatically adjust the lightness setting for any image that is processed by the method of the invention. By this method, images provided by the user can be automatically adjusted for lightness on the basis of the measured mean value of the green channel. In effect, an image not otherwise adjusted by the user can be automatically modified to conform to the experience of the set of images used to create the best-fit line of modification function 230.

FIG. 4B shows a scatter plot 201 of the center range in which a predetermined percentage of the green channel pixels fall vs. selected human-selected contrast setting for improved images. Contrast setting is a term used to describe a modification factor which is a multiplier applied to the pixels in the image to create the effect of broadened or more narrow use of available dynamic range. The center range is a calculated value which represents the difference between a high illumination value and a low illumination value in the green channel. In a preferred embodiment, the center range is calculated by determining the value at the 95th percentile and subtracting from it the value at the 5th percentile. Vertical axis 240 on scatter plot 201 is used to show the result of this calculation. Other ranges and channels can be used, such as pixels between the $10^{th}$ and $90^{th}$ percentile, for example. It has been found that the center range of the green channel is often a good indicator of desired image contrast.

In FIG. 4B, each plotted value 250 represents a contrast value derived from a single image. Its placement on the graph relative to vertical axis 240 relates the contrast to the center range of the green channel for a particular image. A horizontal axis 245 is used to show a contrast setting for improved contrast. For example, values to the right of vertical axis 240 indicate user preference for an increased contrast setting.

Modification function 255 on scatter plot 201 is a best-fit line which creates a linear representation of the values in the scatter plot. Function 255 is an approximation of the trend in user-selected contrast settings for a given center range in the green channel. In practice, line 255 is used to determine a modification factor that is used to automatically adjust the contrast setting for an image that is processed by the method of the invention. By this method, images provided by the user are automatically adjusted for contrast setting on the basis of the calculated center range of the green channel and its corresponding modification function setting, obtained in a similar manner as described with respect to FIG. 4A. In effect, an image that has not been adjusted by the user is automatically modified to conform to the experience of the set of images that were originally used to create the best-fit line 255.

FIG. 4C shows scatter plot 202 of the median value of the green channel minus the median value of the red channel vs. user preferences for human-selected depth removal setting for improved images. The term "depth removal" is used to describe processing in which a percentage of green pixel values are added to spatially identical red pixel values in the image in order to improve color balance. The median value of the green channel minus the median value of the red channel is a calculated value which represents the difference in illumination between the green channel and the red channel or color balance. It has been found that the difference between these two values is often a good indicator of depth or distance to subject for underwater images, and can be used to provide an estimate of how much augmentation of the red channel is likely to be preferred by users. It has been found that the median value of the green channel minus the median value of the red channel, a measure of color balance, is a reasonably accurate predictor of images taken underwater. Large differences between these median values often indicate that the image was captured underwater. However, other values, such as the mean of the green channel minus the mean of the red channel, or the mean of the blue channel minus the mean of the red channel can alternately be used for color balance characterization. In FIG. 4C, each plotted value 260 represents a single image and its placement on the graph corresponds to the median value of the green channel minus the median value of the red channel on vertical axis 265, and the user selected depth removal setting on horizontal axis 270. Modification function 275 on scatter plot 202 is a best-fit line which creates a linear representation of the values in the scatter plot. Modification function 275 is an approximation of the trend in user-selected depth removal (or color balance) settings for a given median value of the green channel. For a user image, this function is used to determine a modification factor, that is, a modification function setting, that is used to automatically adjust the depth removal setting for any image that is processed by the method of the invention. By this method, images provided by the user are automatically adjusted for depth removal settings on the basis of the measured median value of the green channel minus the median value of the red channel. In effect, the image not adjusted by the user is automatically modified to conform to the experience of the set of images used to create the best-fit line of modification function 275.

Adjustments to an image captured underwater as described in explanation of FIGS. 4A, 4B and 4C can be applied individually or in combination. In a preferred embodiment, all three adjustments are applied automatically and the resulting improved visual representation is presented to the user, such as in an arrangement of images as was shown in FIG. 2.

The best-fit lines of modification functions 230, 255 and 275 are empirically determined, based on a sample database of user images that have been assessed for color content, contrast, brightness and other characteristics. The results of this assessment are plotted as modification functions and serve as a guide for modifying user images. A user image that is input to the processing of FIG. 3 can be adjusted using the association provided by modification functions 230, 255, and 275, as well as by other modification functions.

Modification functions 230, 255 and 275 need not be straight lines. In practice, however, it has been found that a straight line can suffice to provide a reasonable amount of improvement in many cases. With additional data resulting from user selections, the best fit line relationship can be determined by calculating the best average line through a plot for measured or calculated values vs. user-selected improvements for a number of improved images. The user-selected improvements can be either without the benefit of automatic adjustment, or can incorporate automatic adjustment by the method of the invention or other methods. User acceptance of the automatic adjustment or modification to the automatic adjustment can constitute user selection of improvements. User-selected improvements can be provided by expert users, including users familiar with color characteristics and correction techniques, or can be provided by users without any reference to particular expertise.

According to an alternate embodiment of the present invention, a measure of training can be provided, by which data accumulated in using the software is used to affect how the software operates, such as by adjusting the linear shapes of modification functions 230, 255, and 275, for example. By collecting measured statistical values and user-selected improvements for many images, the best fit lines used to make improvements to a particular underwater image can be made to conform to the preferential improvements selected by many users. For example, if a particular image is determined to have measured values similar to a population of images that have similar desirable improvements, then the particular image can be improved in a similar manner with a high degree of certainty that the improvements applied to the particular image will also be desirable.

According to an embodiment of the present invention, a computer program product using the method of the invention provides automatic adjustment of images captured underwater, and also saves measured values and corresponding user-selected improvements. Using the method of an embodiment of the present invention, the computer program product, running on a user computer or on a remote server automatically improves the user's images and records the results. The computer program product can send the saved measured values and corresponding user-selected improvements to a server with a repository for these data so that they can be incorporated with the data from other users for determination or re-calculation of a best fit line.

It should be noted that the term "memory", equivalent to "computer-accessible memory" in the context of the present disclosure, can refer to any type of temporary or more enduring data storage workspace used for storing and operating upon image data and accessible to a computer system, including a database, for example. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It will be understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The best fit line may also be determined from a subset of available data. The statistics and user-selected improvements for certain images can be too different from the general population to be useful in determining the best fit line. These images, referred to as outliers, can be left out of the data set used to determine the best fit line when identified by well known techniques such as computing the standard deviation for the data set and removing the images beyond an acceptable range of standard deviation. Outlier images are often images that are very poorly exposed or extreme close ups with flash illumination that are unlikely to benefit significantly from automatic improvement. In FIG. 2C, for example, outliers 280 are identified by circles around data points.

Image analysis for determination of statistics can be performed using a low resolution version of the captured image. All of the pixels in the image need not be analyzed to provide statistical data. Additionally, the improvements determined by the method of the invention can be applied to a low resolution representation of the image captured underwater, and after the automatic improvement has been applied, the user can modify the amount of improvement via input from dials, sliders, typing numbers or other well known input means. When the user is satisfied with the improvements, the values determined are applied to the high resolution image while the user continues on to work on subsequent images.

Brightness and contrast modifications to pixels in an image can be done in concert across all the channels in the image, or can be applied separately in each channel. Similarly, sharpening of the image can be done selectively by channel. For underwater images in particular, this can provide advantages. Since most of the luminance information resides in the green channel, it is advantageous to sharpen only the green channel by methods such as the well known practice of unsharp masking. Additionally, since the red channel is often severely attenuated, much of the noise in the image is in the red channel, particularly after amplifying that channel. Blurring the red channel, for example by use of a low pass filter, minimizes the effect of any high frequency noise. Often, blurring the blue channel has a similar beneficial effect.

Other color spaces can be used to provide improvements. Other color spaces include, for example, YUV color space, CIELAB color space, and CMYK color space. For example, if the image is converted to YUV color space, sharpening is only applied to the luminance channel, and the two chrominance channels can be blurred or not modified. Also, different statistical data and calculations corresponding to the color space can be used to determine automatic improvements.

Video imagery can be corrected by techniques similar to those discussed above. In the case of video, the improvements can be calculated or selected for a single frame and then applied to all the frames in the entire video. In a preferred embodiment, the frames of a video clip are decompressed so that they exist as individual frames. At least one of the individual frames or a lower resolution version of the at least one frame is selected, either by statistical analysis of the video clip or by the user, as a typical or important frame for that video clip. Once selected, the frame is treated as a captured still image described above, and improvements are applied. When the user is satisfied with either the automatically selected improvements or his own modifications of the automatically selected improvements, the selected improvements are applied to each frame in the entire video clip.

In an alternative embodiment, frames from the video clip are analyzed to detect statistically significant diversion from the existing norm. That is to say that if the statistical analysis of individual video frames begins to differ significantly from the previous frames, it is an indication that different improvements may be desired. When a statistically significant difference has been detected, the user can be prompted to specify new improvements, or improvements can be applied automatically as specified above. In either case, different improvements are applied to different sections of the clip.

In the course of applying new improvements to a video clip, it is important that changes in contrast, depth removal, lightness, sharpness or any combination of these parameters be applied gradually so as not to alert a viewer that new improvements have been applied. The transition from one set of improvements to another can be applied over numerous consecutive video frames by applying an increasing percentage of the change. For example, if 100 frames are used for the transition, and the transition is linear, the 27th frame will have applied 27% of the full difference from the previous improvements to the next improvements. Note also that the transition need not be linear, and may take more or less frames to complete the transition.

It is to be understood that various other changes and modifications may be made without departing from the scope of the present invention. The present invention is defined by the following claims.

The invention claimed is:

1. A method for image processing, the method executed at least in part by a computer system and comprising:

a) acquiring a digital image as a collection of image pixels, wherein each pixel has a corresponding data value in at least a first channel and a second channel of a color space;
b) calculating, from a plurality of the image pixels, a first statistical measurement according to values in the first channel of the color space;
c) calculating, using the second color channel value for a plurality of the image pixels, a second statistical measurement;
d) calculating a difference value that is representative of the difference between the first and second statistical measurements;
e) associating the calculated difference value with a predetermined modification function setting for modifying values in the second channel of the color space according to a best-fit line function that has been calculated from a database of sample images;
f) forming a processed image by adjusting values in the second channel of the color space according to the best-fit line function; and
g) displaying the processed image.

2. The method of claim 1 further comprising determining effects of depth or distance for the image captured underwater.

3. The method of claim 1 further comprising scaling the image to form a reduced size collection of image pixels.

4. The method of claim 1 wherein the statistical measurement is taken from the group consisting of a mean, a median, a mode, and a standard deviation.

5. The method of claim 1 wherein the at least one calculated statistical measurement is a median value obtained from a green color channel and wherein forming the processed image adjusts color balance.

6. The method of claim 1 wherein the statistical measurement is representative of image brightness.

7. The method of claim 1 wherein the statistical measurement is representative of image brightness in a single color channel.

8. The method of claim 1 wherein the statistical measurement is representative of image contrast.

9. The method of claim 1 wherein the statistical measurement is representative of color balance.

10. The method of claim 1 wherein adjusting the acquired collection of image pixels applies a non-linear mapping to the collection of image pixels.

11. A method for image processing, the method executed at least in part by a computer system and comprising:

a) acquiring a digital image as a collection of image pixels, wherein each image pixel has a red color channel value, a green color channel value, and a blue color channel value;
b) determining the effect of depth or distance to a subject when the image was captured underwater;
c) calculating, using the green color channel value and either the red or blue color channel value for a plurality of the image pixels, a statistical measurement according to the effect of depth or distance;
d) associating the calculated statistical measurement with a predetermined modification function setting that relates to red or blue color channel values according to a best-fit line function that has been calculated from a database of sample images;
e) forming a processed image by adjusting the red or blue color channel values of the acquired collection of image pixels according to the best-fit line function; and
f) displaying the processed image.

12. The method of claim 11 wherein the predetermined modification function relates to image brightness.

13. The method of claim 11 wherein the predetermined modification function is derived from a plurality of images captured underwater.

14. The method of claim 11 further comprising forming and displaying a plurality of processed images according to additional modification function settings.

15. A method for image processing, the method executed at least in part by a computer system and comprising:

a) acquiring a digital image as a collection of image pixels, wherein the digital image has at least a first, a second, and a third color channel;
b) determining that the image was captured underwater;
c) calculating, using the first color channel value for a plurality of the image pixels, a statistical measurement;
d) associating the calculated statistical measurement with a predetermined modification function setting according to a best-fit line function that has been calculated from a database of sample images;
e) forming a processed image by adjusting the acquired collection of image pixels according to the associated predetermined modification best-fit line function setting, wherein the adjustment changes pixel values in each of the first, second, and third color channels; and
f) displaying the processed image.

16. The method of claim 15 wherein the first color channel is a green color channel and wherein the second color channel is a red color channel.

17. The method of claim 15 wherein the statistical measurement is a statistical mean.

18. The method of claim 15 wherein determining that the image was captured underwater comprises calculating color balance according to two or more of the color channels.

* * * * *